United States Patent
Konno et al.

(10) Patent No.: US 6,907,611 B2
(45) Date of Patent: *Jun. 14, 2005

(54) CLAMP MECHANISM AND INFORMATION REPLAY APPARATUS USING SAME

(75) Inventors: Yasushi Konno, Kawagoe (JP); Toru Suzuki, Kawagoe (JP); Takashi Satoh, Kawagoe (JP); Ryosuke Shimosawa, Kawagoe (JP); Yasuhiro Shinkai, Kawagoe (JP); Akihiro Muto, Kawagoe (JP); Yasuo Ogiwara, Kawagoe (JP)

(73) Assignee: Pioneer Corporation, Tokyo-to (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 44 days.

(21) Appl. No.: 10/138,779

(22) Filed: May 6, 2002

(65) Prior Publication Data

US 2002/0176352 A1 Nov. 28, 2002

(30) Foreign Application Priority Data

May 25, 2001 (JP) .................................... P2001-157338

(51) Int. Cl.$^7$ .............................................. G11B 23/00
(52) U.S. Cl. ......................................... 720/604; 369/271
(58) Field of Search ......................... 720/604; 369/271, 369/270

(56) References Cited

U.S. PATENT DOCUMENTS

| | | | | |
|---|---|---|---|---|
| 5,166,920 A | * | 11/1992 | Kogure | 369/270 |
| 5,637,200 A | * | 6/1997 | Tsymberov | 204/298.15 |
| 5,774,445 A | * | 6/1998 | Sawi et al. | 369/270 |
| 6,249,506 B1 | * | 6/2001 | Oowaki et al. | 369/271 |

FOREIGN PATENT DOCUMENTS

JP          10-162463          6/1998

* cited by examiner

Primary Examiner—A. J. Heinz
Assistant Examiner—Mark Blouin
(74) Attorney, Agent, or Firm—Morgan Lewis & Bockius LLP

(57) ABSTRACT

A clamp mechanism comprises a turntable, a plurality of chuck claws, and a driving element. The turntable is rotatably driven by a motor. A disc serving as a recording medium is placed on the turntable. The chuck claws are used to hold, that is, clamp the disc on the turntable. The driving element drives the chuck claws both in both a first direction determined to clamp the disc and a second direction determined to unclamp the disc. The driving element includes a pressing portion so that travel of the chuck claws in the first direction in cases where the chuck claws are driven in the second direction. This offers stable clamping and unclamping operations of the chuck claws to detachably hold the disc on the turntable, independently of which attitude the disc takes.

18 Claims, 5 Drawing Sheets

CLAMP MECHANISM AND INFORMATION REPLAY APPARATUS USING SAME

BACKGROUND OF THE INVENTION

1. Technical Field

The present invention relates to a clamp mechanism to support information mediums such as CDs (Compact Discs) and DVD (Digital Versatile Discs) on a turntable and to an information replay apparatus equipped with the clamp mechanism.

2. Related Art

An information replay apparatus that requires a compact disc serving as an information-recording medium has usually a clamp mechanism for supporting the compact disc on a turntable.

A conventional clamp mechanism is disclosed by Japanese Patent Publication (Laid-open) No. 10-162463, of which longitudinally sectioned configurations are shown in FIGS. 9 and 10. FIG. 9 represents an unclamping state of the clamp mechanism, while FIG. 10 represents a clamping state thereof.

As shown in FIGS. 9 and 10, a chuck rotating mechanism (that is, a clamp mechanism) 1 has a disc table 2 (that is, a turntable). The disc table 2 is fitly mounted on a rotation shaft 3a and a rotation motor 3, so that the disc table 2 is driven by the rotation axis 3a. A chuck-moving member 4 is fitly mounted on a cylindrical body of the disc table 2 and slidable along the cylindrical body surface in the up-and-down direction. Between the chuck-moving member and a body of the rotation motor 3, a spring is inserted to force the chuck-moving member 4 upward. Both of the chuck-moving member 4 and the spring 5 can be driven together with the disc table 2 in response to rotation of the rotation motor 3. As shown, the chuck-moving member has a tapered flange located around its main body and of which upper surface is descendent outwardly. When an operating piece 6, which is part of a chuck control mechanism, is moved to the left in FIGS. 9 and 10, the chuck-moving member 4 is forcibly lowered against a pushing force of the spring 5.

In addition, the chuck rotating mechanism 1 has three chuck claws 7, and each of the side views of each claw is formed into an almost V-shape. Each chuck claw 7 has a rotation shaft 7a not only formed at its base but also rotatable around an axis in the horizontal direction. The disc table 2 supports the rotation shaft 7a, so that each chuck claw 7 is rotatable around a horizontal axis. The back of each chuck claw 7 is formed into a bent back and disposed so as to make its bent back contact to the chuck-moving member 4. When the chuck-moving member 4 is pushed downward by the operating piece 6 (moved by a not-shown pickup moving mechanism), each chuck claw rotates, due to its self-weight, around its rotation shaft 7a in a direction F shown in FIGS. 9 and 10.

As a result, a tip portion of each chuck claw 7 is made to retract and submerge into a predetermined inside spacing (refer to the unclamped state shown in FIG. 9). In contrast, when the pushing force that has been given to the chuck-moving member 4 from the operating piece 6 is removed, the spring 5 allows the chuck-moving member 4 to move upward. Thus the chuck-moving member 4 pushes each chuck claw 7 upward, so that each chuck claws 7 is forcibly rotated around its rotation shift 7a in a direction E shown in the figures. By this rotation, the tip end of each chuck claw 7 protrudes upward from the inside spacing beyond a disc-mounting surface of the disc table 2, so that the chuck claws 7 are able to clamp the disc 8 (refer to the clamped state shown in FIG. 10). Each chuck claw 7 has a stopper 7b formed on both sides thereof and the stopper 7b regulates the rotation of each chuck claw 7 in the direction E by making it contact a given portion of the disc table 2.

As described above, in the conventional clamp mechanism, rotation of the plural chucks 7 in the predetermined clamping direction allows the disc 8 placed on the disk table 2 to be clamped. When removing the disc 8 from the disc table 2, the chucks 7 are made to rotate in the unclamping direction due to the self-weight.

Thus, the clamping and unclamping operations are realized in such that the chucks 7 rotate upward to emerge above the disc 8 placed on the disc table 2 or rotates downward below the disc 8. It is therefore unnecessary to arrange a rotational mechanism to press the disc 8 downward from the top thereof.

There has been known a conventional information replay apparatus capable of replaying information in an attitude oblique to the ground. In this case, an information-recording surface of a disc contained in the apparatus is also positioned in an oblique angle to the ground.

However, the conventional information replay mechanism comprising the foregoing clamp mechanism has a problem that the chuck claws 7 remain protruded over the disc 8 on the disc table 2, without being rotated downward below the turntable. To be specific, this problem may happen in cases where the disc 8 (that is, its information recording surface) is positioned in a perpendicular attitude or in oblique attitudes closer to the perpendicular angel to the ground. This is because the self-weight of each chuck claw 7 is utilized to rotate in the unclamping direction.

If such a situation is caused, it is no longer difficult to smoothly unclamp the disc 8. In addition, it is also difficult to load the disc 8 on the disc table 2, provided the chuck claws 7 protrudes upward. That is, the chuck claws 7 that have protruded to emerge from the disc table 2 become obstacles to the disc 8 to be loaded newly.

In addition to the foregoing problem, there is another problem that the shape of each chuck claw 7 is restricted in design. In other words, there is the necessity of considering the gravity center of each chuck claw 7. This problem is also attributable for the fact that the unclamping operation is based on the self-weight of each chuck claw 7.

SUMMARY OF THE INVENTION

The present invention has been made with due consideration to the foregoing drawbacks, and an object of the present invention is to provide a clamp mechanism and an information replay apparatus using the same, which are able to steadily offer clamping and unclamping operations to holding devices for sustaining a recording medium on a turntable, independently of which attitude the recording medium takes.

A second object of the present invention is to provide a clamp mechanism and an information replay apparatus using the same, which eliminate the necessity of considering the gravitation center of each chuck claw serving as holding devices when unclamping a recording medium that has been clamped.

In order to accomplish the foregoing objects, as one aspect, the present invention provides a clamp mechanism comprising: a turntable on which a recording medium is placed, the turntable being rotated by a rotation driving device; a holding device for holding the recording medium on the turntable; and a driving device for driving the holding device in both a first direction determined to clamp the recording medium and a second direction determined to unclamp the recording medium, the driving device including a prohibiting device for prohibiting the holding device from moving in the first direction in cases where the holding device is driven in the second direction.

As a result, the clamp mechanism of the present invention is able to have the prohibiting device that prohibits the plural chuck claws serving as the holding device from moving in the clamping direction in cases where the chuck claws are driven in the direction along which a recording medium is released from its hold on the turntable. Thus, even if the recording medium is located so that its information-recording surface is given a tilt of any angle, the clamped state of the medium can be released steadily. This improves greatly steadiness of the unclamping operations.

It is preferred that the holding device consists of a plurality of chuck claws disposed rotatably on the turntable, the driving device includes a movable member slidable in a perpendicular direction to a surface of the turntable on which the recording medium is placed, and the prohibiting device includes a pressing member for pressing the plurality of chuck claws in the second direction in cases where the moving member slides in a direction going away from the surface of the turntable.

Hence, there is no necessity of considering the gravitational center of each chuck claw that serves as the holding device. Therefore, the degree of freedom in designing of the chuck claws is raised.

It is also preferred that each of the plurality of chuck claws has a body having two ends, one end being formed to hold the recording medium on the turntable and the other end being formed to be driven in the second direction in response to a pressing operation given from the pressing member.

Preferably, the clamp mechanism further comprises a guide member for guiding a slide of the movable member in the perpendicular direction to the surface of the turntable.

It is also preferred that the turntable has therearound a tapered flange of which lower surface includes a surface ascending outwardly in a radial direction of the flange of the turntable and the movable member has therearound a tapered flange of which upper surface includes a surface descending outwardly in a radial direction of the flange of the movable member.

As another aspect, the present invention provides an information replay apparatus in which a clamp mechanism is disposed to detachably clamp a recording medium placed on a turntable rotatably driven by a rotation driving device, the clamp mechanism comprising: a holding device for holding the recording medium on the turntable; and a driving device for driving the holding device in both a first direction determined to clamp the recording medium and a second direction determined to unclamp the recording medium, the driving device including a prohibiting device for prohibiting the holding device from moving in the first direction in cases where the holding device is driven in the second direction.

Accordingly, the information replay apparatus according to the present invention provides steadier releasing operations from the clamped state of a disc, so that the apparatus can be enhanced in reliability for replying information.

Still, as another aspect, the present invention provides a clamp mechanism for detachably clamping an information-recording medium placed on a turntable. This clamp mechanism comprises a movable member movable toward and away from the turntable in clamping and unclamping the information-recording medium; and a plurality of holding members each placed in a spacing formed through the turntable and each rotatable in both a clamping direction and an unclamping direction to allow the information-recording medium to be clamped and unclamped. Each holding member has a first end to clamp the information-recording medium on the turntable, a second end functioning as an axis around which each holding member is rotatable, and a third end made to contact the movable member. The movable member has a surface formed to push the third end of each holding member in the clamping direction when the movable member is driven to move toward the turntable; and a protrusion formed to not only press the third end of each holding member in the unclamping direction but also prohibit the third end of each holding member from moving in the clamping direction when the movable member is driven to move away from the turntable.

As a result, when the movable member is driven to move toward the turntable, the third end of each holding member is pushed in the clamping direction, thus clamping the medium on the turntable. By contrast, when the movable member is driven to move away from the turntable, the third end of each holding member is pressed by each protrusion of the movable member in the unclamping direction. The clamped state of the medium is therefore released, providing an unclamped state of the medium. Concurrently, during this unclamping action or after establishment of the unclamped state, the third end of each holding member is prohibited from moving in the clamping direction thanks to each protrusion of the movable member. Thus, the unclamped state is maintained with stability, even when an information replay apparatus having this clamp mechanism is placed to have a tilted attitude.

BRIEF DESCRIPTION OF THE DRAWINGS

Other objects and aspects of the present invention will become apparent from the following description and embodiments with reference to the accompanying drawings in which.

DETAILED DESCRIPTION OF PREFERRED EMBODIMENT

Refereeing to the accompanying drawings, a preferred embodiment of the present invention will now be described. In the following, a disc replay apparatus employed as an information replay apparatus will be described. The disc replay apparatus, which adopts therein a clamp mechanism according to the present invention, is configured to replay information recorded on recording mediums such as CDs and DVDs (hereafter simply referred to as discs).

Figure 1:
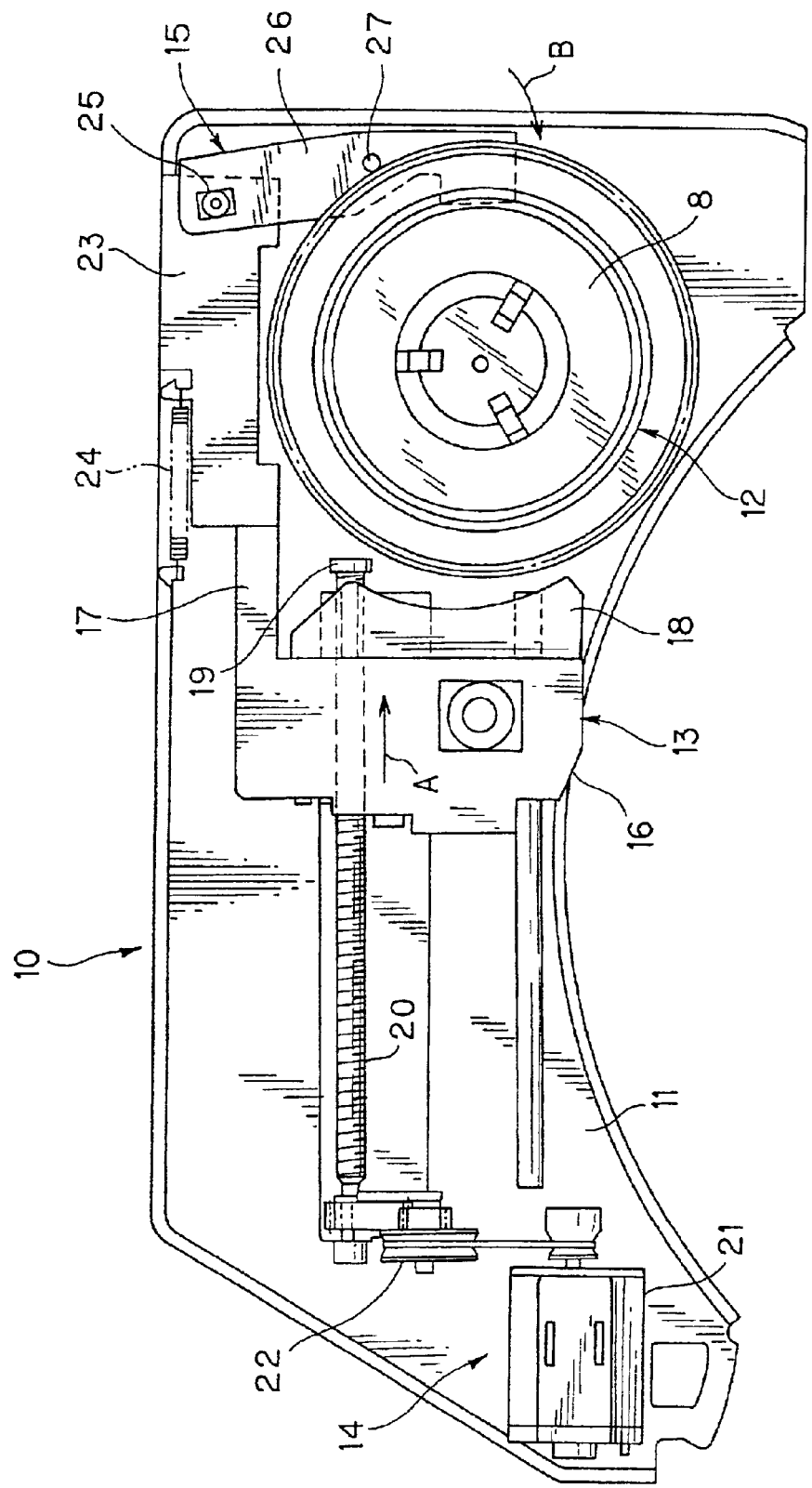
FIG. 1 is a plan view showing an information replay apparatus to which a clamp mechanism according to the present invention is applied.
Figure 2:
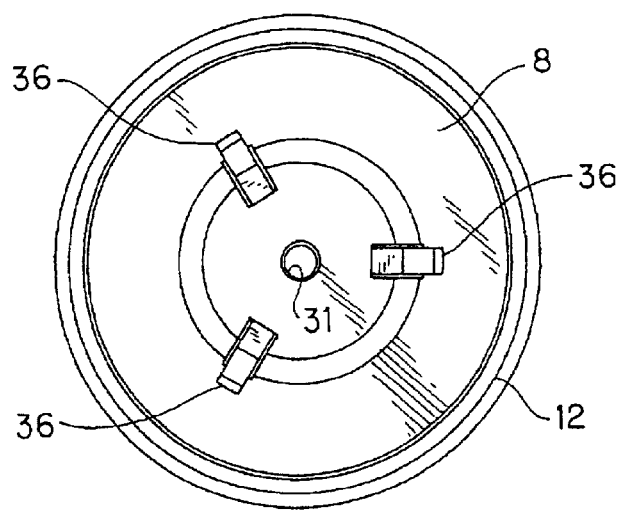
FIG. 2 is a plan view showing a turntable employed by the clamp mechanism.

FIG. 1 shows a plan view of the disc replay apparatus with the clamp mechanism configured in accordance with the present invention. As shown in FIG. 1, the disc replay apparatus 10 has a movable base 11, on which a turntable 12, pickup 13, pickup moving mechanism 14, and a clamp controlling mechanism 15 are mounted.

The pickup 13 is provided with a securing base 16 formed in its plane view into an approximately L-shape. A pressing protrusion 17 is integrally formed on one side of the securing base 16, in which the one side faces the turntable. Additionally, on the one side of the securing base 16, an operating member 18 is fixed.

The pickup moving mechanism 14 is provided with a screw shaft 20 whose one end is supported by a support member 19. Further, the pickup moving mechanism 14 is also provided with a drive motor 21 and a drive-force transmission mechanism 22 including pulleys and belts to transmit a drive force generated by the drive motor 21 to the screw shaft 20.

The clamp controlling mechanism 15 includes a movement member 23, a coil spring 24, and an operation lever 26. Of these constituents, the movement member 23 is pressed by the pressing protrusion 17 formed on the securing base 16 of the pickup 13. The coil spring 24 forces the movement member 23 downward in the drawing of FIG. 1. The operation lever 26 is rotatably connected with the movement member 23 via a connection shaft 25, so that the operation lever 26 is configured rotatably around a support shaft 27.

FIGS. 2 to 5 show a clamp mechanism 30 that essentially comprises the turntable 12, a rotation motor 32, a movable member 34, a spring 35, and a plurality of chuck claws functioning as holding members according to the present invention. The turntable is formed into a disc-like plate, on which the disc 8 is mounted. The rotation motor 32 serves as a rotation driving device mounted and its rotation shaft 32a is inserted into a shaft-inserting perforation 31 of the turntable 12. The movable member 34 fixedly accepts a cylindrical portion 33 of the turntable 12 and is slidable in a direction perpendicular to a disc-mounting surface of the turntable 12 (that is, slidable in the up-and-down direction in FIGS. 3 and 4). Further, the spring 35 intervenes between the movable member 34 and the rotation motor 32, with the result that the movable member 34 is forced upward or downward. The plural chuck claws 36 are arranged to be able to freely emerge above the disc-mounting surface of the turntable 12.

The turntable 12 is thus able to rotate responsively to rotation of the axis 32a of the motor 32, and both of the movable member 34 and the spring 35 rotate together in response to the turntable 12.

Figure 6:
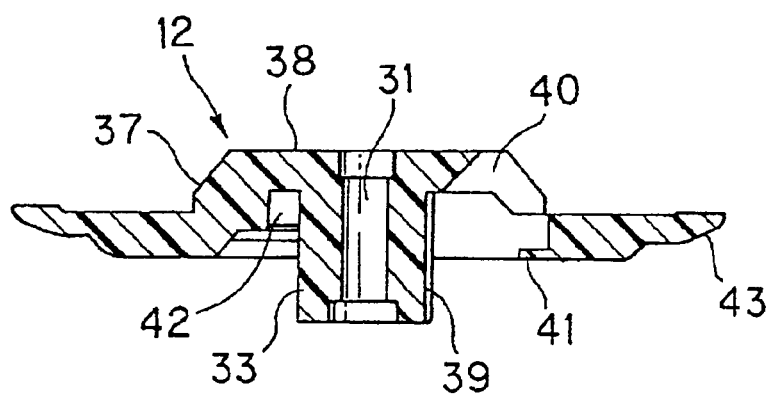
FIG. 6 shows a longitudinal section of the turntable.

As shown in FIG. 6, the turntable 12 is formed so that it has the cylindrical portion 33 integrally formed with the turntable 12 to protrude from the center on the lower surface of the turntable 12. The shaft-inserting perforation 31 is formed through the cylindrical portion 33 and, as described above, the rotation shaft 32a of the motor 32 is fit into the perforation 31. On the other hand, on the upper surface of the turntable 12 is formed a circular stepped portion 38 that is linked to a sloped surface 37 onto which the center hole of the disc 8 is applied.

As shown in FIG. 6, on the outer circumferential surface of the cylindrical portion 33, three longitudinal recessed grooves 39, each serving as a guide member of the present invention, are formed at equal intervals in the circumferential direction. Practically, the three recessed grooves 39 are formed at angular intervals of 120 degrees when measured from the center of the turntable 12. Furthermore, in a space ranging from the stepped portion 38 of the turntable 12 to the bottom thereof, three claw-mounting spaces 40 used for containing therein the chuck claws 36 are formed at equal intervals in the circumferential direction. In other words, the three claw-mounting spaces 40 are formed at angular intervals of 120 degrees when measured from the center of the turntable 12. At the position corresponding to the bottom of each claw-mounting space 40, a supporting protrusion 41 to support each chuck claw 36 is integrally formed with the turntable so that it protrudes radial-inward from the turntable 12.

A circular stepped recess 42 that can accept the movable member 34 is formed on the bottom, other than the three claw-mounting spaces 40, of the stepped portion 38. Around the stepped portion 38, a tapered flange 43 is also formed integrally with the stepped portion 38. The lower surface of the tapered flange 43 is shaped to be ascendant outwardly in the radial direction thereof.

Figure 7:
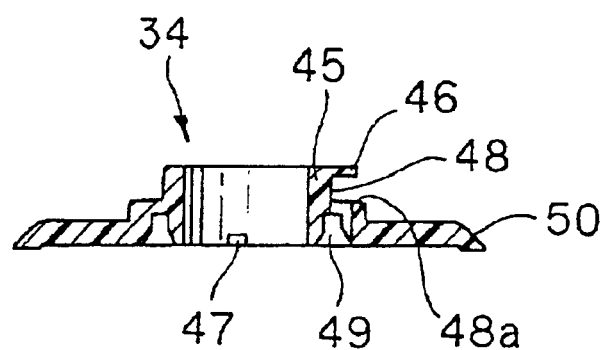
FIG. 7 shows a longitudinal section of a movable member employed by the clamp mechanism.

FIG. 7 shows in detail the movable member 34 having a cylindrical body 45 at a central portion of the member 34. On the upper end of the cylindrical body 45, three pressing protrusions 46 are integrally formed with the body so that they protrude outwardly in the radial direction of the body. The pressing protrusions 46, which serve as a prohibiting device of the present invention, are located at equal intervals in the circumferential direction, that is, at angular intervals of 120 degrees when viewed from the center of the turntable 12. These pressing protrusions 46 prohibit rotational motions of the plural chuck claws 36 at certain rotational positions in the case that the chuck claws 36 are driven to rotate in a direction determined to release the chuck claws 36 that have clamped the disc 8. To be specific, the pressing protrusions 46 press the lower ends of the chuck claws 36 downward when the movable member 34 is driven to slide in the downward direction going away from the turntable 12. This press enables the chuck claws 36 to forcibly rotate in a direction permitting the disc 8 to be released from its hold on the turntable 12. The direction corresponds to a downward direction submerging below the disc-mounting surface of the turntable 12 (hereafter, referred to as an unclamping direction corresponding to the second direction according to the present invention). Thus, the chuck claws 36 can be prevented from rotating in an upward direction emerging above the disc-mounting surface of the turntable 12 (hereafter, referred to as a clamping direction corresponding to the first direction according to the present invention).

Some reasons may cause the chuck claws 36 once driven down to their predetermined lowest positions in the unclamping direction to be driven in the clamping direction. If such situation may happen, a rotational motion of the chuck claws 36 in the clamping direction is surely prohibited, because the lower end of each chuck claw 36 is pressed downward.

The foregoing operating member 18, operation lever 26, movable member 34, spring 35, and pressing protrusions 46 are employed to substantially compose the driving device of the present invention.

As shown in FIG. 7, on the inner circumferential lower end of the cylindrical body 45, three projections 47 also functioning as guide the member according to the present invention are formed integrally with the body so that they project inward in the radial direction of the cylindrical body 45. The three projections 47 are located at equal angular intervals in the circumferential direction, that is, at angular intervals of 120 degrees when viewed form the center of the turntable 12. Each of these projections 47 is configured to fit into each of the recessed grooves 39 formed on the outer circumferential surface of the cylindrical portion 33 of the turntable 12, respectively. Thus, the movable member 34 is slidable longitudinally along the cylindrical portion 33 also functioning as the guide member of the present invention.

Furthermore, as shown in FIG. 7, below the pressing protrusions of the cylindrical body 45, there are continuously formed engaging recesses 48 to engage with the lower end portions of the chuck claws 36 and contact surfaces 48a to allow such lower end portions to be contacted. In addition, a circular retaining groove 49 to retain one end of the spring 35 is formed at a given radial position on the bottom surface of the cylindrical body 45. The cylindrical body 45 is also integrally coupled with a ring-like tapered flange 50 located around the body 45, as shown in FIG. 7. The tapered flange 50 has an upper surface including an end surface descending outwardly in the radial direction thereof.

Figure 3:
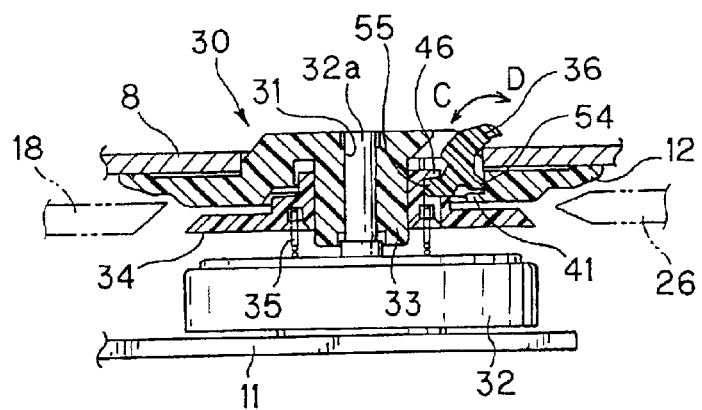
FIG. 3 is a longitudinal sectioned view representing a clamped state of a disc realized by the clamp mechanism.
Figure 4:
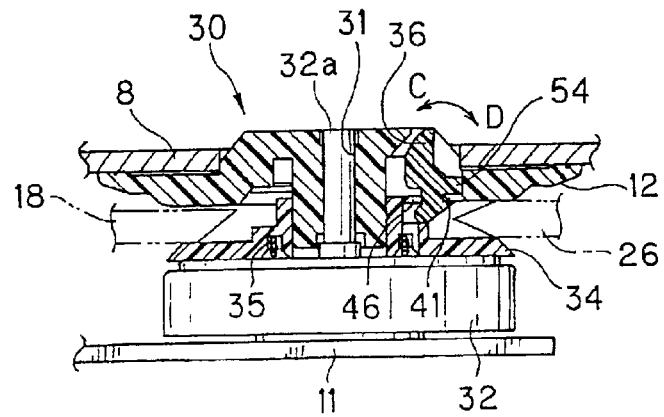
FIG. 4 is a longitudinal sectioned view representing an unclamped state of the disc realized by the clamp mechanism.
Figure 5:
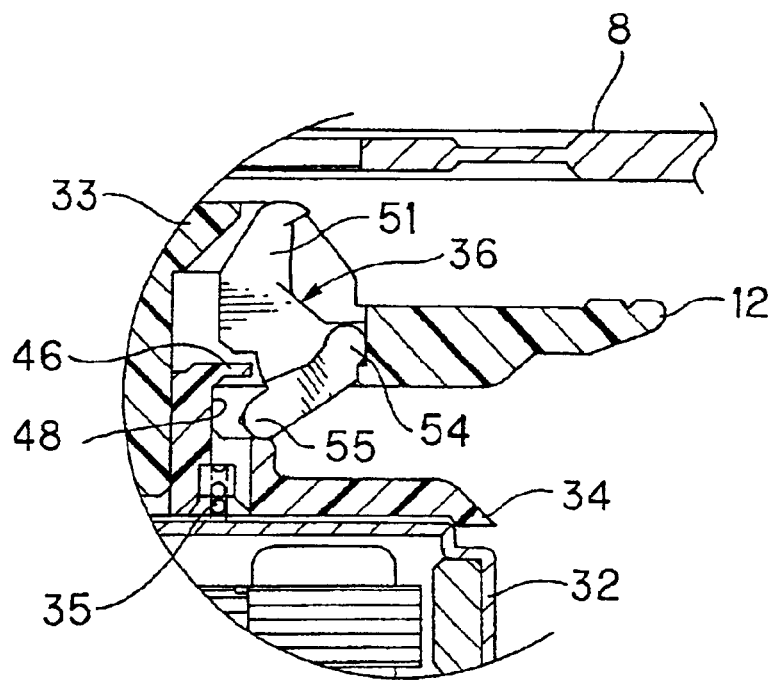
FIG. 5 is an enlarged sectional view showing part of the clamp mechanism.

On the other hand, as shown in FIGS. 3 and 4, each chuck claw 36 is loaded rotatably in each of the three claw-mounting spaces 40 formed in the turntable 12. Each chuck claw 36 is permitted to emerge or submerge above or below the disc-mounting surface of the turntable 12 by making the movable member 34 slide along the cylindrical portion 33 of the turntable 12. These emerging and submerging operations, that is, clamping and unclamping operations, make it possible to detachably mount the disc 8 on the turntable 12. During each of such operations, the lower end portion of each chuck claw 36 is held by either of each supporting protrusion 41 of the turntable 12 or each engaging recess 48 of the movable member 34 (refer to FIGS. 3 to 5).

Figure 8A:
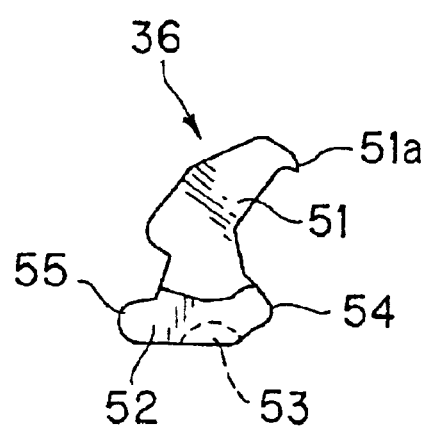
FIGS. 8A and 8B are a side view and the frontal view of each chuck claw adopted by the clamp mechanism, respectively.
Figure 8B:
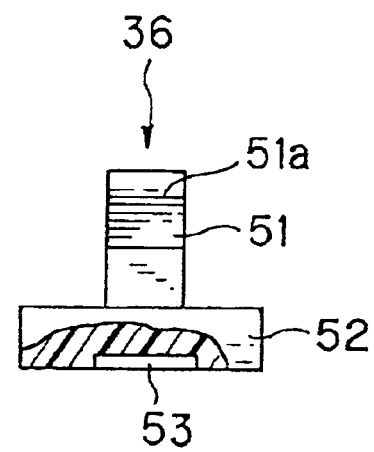
Figure 9:
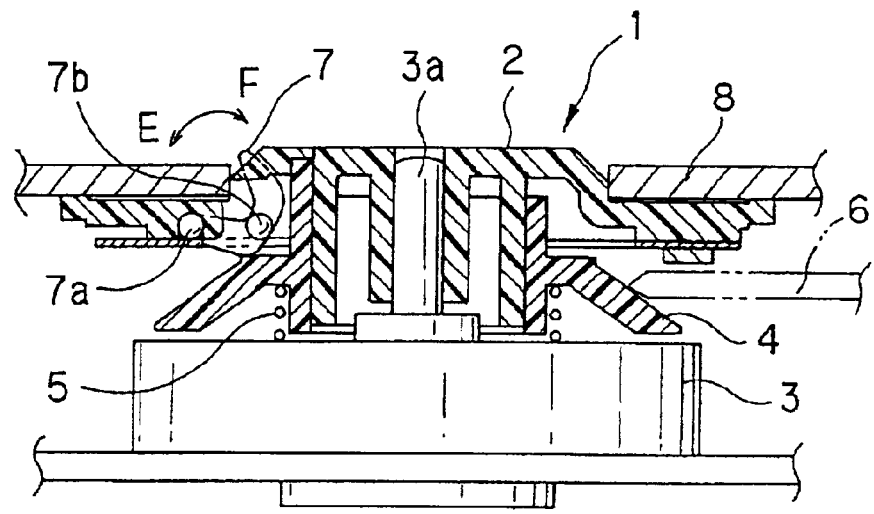
FIG. 9 is a longitudinal sectioned view representing a clamped state of a disc realized by a conventional clamp mechanism.
Figure 10:
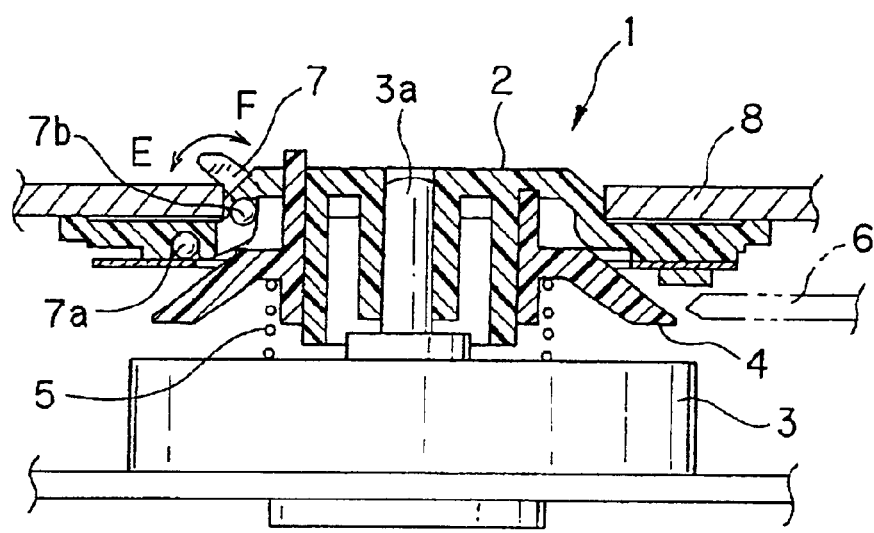
FIG. 10 is a longitudinal sectioned view representing a clamped state of the disc realized by the conventional clamp mechanism.

Each chuck claw 36 is, made of, for example, synthetic resin, shaped into an integral form. As shown in FIGS. 8A and 8B, each chuck claw 36 has a hook-shaped body 51 on its one end side, in which the body 51 further has at its end a holding tip 51a formed into an approximate wedge shape in section. Every time the movable member 34 moves upward to remain at a predetermined high position, the hook-shaped body 51 is forced to appear from, that is, emerge above the disc-mounting surface of the turntable 12. This protrusion of the body 51 enables its holding tip 51a to hold the disc 8 on the turntable 12.

The other end side of each chuck claw 36 is formed as a base 52 shaped into a substantially rectangular plate-like form. On the bottom surface of the base 52 is provided a bottomed recess 53 into which each supporting protrusion 41 of the turntable 12 can be fit. Further, on the frontal side of the base 52 is formed an engaging protrusion 55 that can be fit into each engaging recess 48 of the movable member 34 so as to come into contact with each contact surface 48a.

Thus, each of the plurality of chuck claws 36 is configured such that one side thereof can be rotated about a support protrusion 54 formed at one end of the base 52. On the other end opposing the one side, an engaging protrusion 55 is formed. Accordingly, the engaging protrusion 55 is configured such that it is pressed by each pressing protrusion 46 of the movable member 34.

The operations of the clamp mechanism 30 according to the present embodiment will now be described.

When the disc replay apparatus 10 is in operation with the disc 8 clamped on the turntable 12, the clamp mechanism 30 is brought into a state shown in FIG. 3. Namely, the plural chuck claws 36 protrude above the disc-mounting surface of the turntable 12 in order to hold the disc 8 on the turntable 12 in a secure fashion.

In cases where an operator issues a command to eject he disc 8, the disc replay apparatus 10 begins starting releasing the clamped state of the disc 8 responsively to the issued command. First, the motor 21 is driven to rotate, in which a generated drive force is transmitted to the screw shaft 20 via the drive-force transmission mechanism 22, resulting in that the screw shaft 20 is forcibly rotated. The rotation of the screw shaft 20 allows the pickup 13 to move in the direction A in FIG. 1, so that both of the pressing protrusion 17 and the operating member 18 travel in the same direction A responsibly to the move of the pickup 13.

The travel of the operating member 18 will cause the movement member 23 to move in the direction toward the turntable 12 against a repelling force of the coil spring 24. In response to the travel of the operating member 18, the operation lever 26 connected to the connection shaft 25 is forced to rotate around the support shift 27 in the direction B shown in FIG. 1. Thus, as shown in FIG. 4, both of the operation lever 26 and the operating member 18 are forcibly inserted into a space formed between the turntable 12 and the movable member 34. Their insertions push up the movable member 34.

When the movable member 34 is moved downward in response to the insertions of both the operation lever 26 and the operating member 18, the pressing protrusions 46 of the member 34 push down the engaging protrusion 55 of each chuck claw 36. In response, each chuck claw 36 is forcibly rotated in the direction C around the support protrusion (i.e., a fulcrum) of the base 52 supported by each supporting protrusion 41 of the turntable 12. This rotation responsibly causes the hook-shaped body 51 to retract (submerge) below the disc-mounting surface of the turntable 12. Accordingly, the clamped state of the disc 8 can be released.

On the other hand, both the operating member 18 and the operation lever 26 are driven to retract so that the movable member 34 is released from its pressed state, the engaging protrusion 55 of each chuck claw 36 is pressed onto the contact surface 48a of the movable member 34. Hence each chuck claw 36 is forced to rotate in the direction D around the support protrusion 54 serving as the fulcrum, resulting in that the hook-shaped body 51 is forcibly made to emerge above the disc-mounting surface of the turntable 12. Accordingly, the disc 8 can be clamped steadily by the holding tips 51a of the chuck claws 36.

In this way, the clamp mechanism has the three pressing protrusions 46 are mounted at equal intervals on the upper circumferential end of the cylindrical body 45 of the movable body 34. When the movable member 34 is forced to slide downward away from the turntable 12 (that is, pushed down), the pressing protrusions 46 push the lower ends of the plural chuck claws 36 in the unclamping direction. This pushing action prevents each chuck claw 36 from rotating in the clamping direction. It is therefore possible that even when the disc 8 (i.e., its information-recording surface) is placed at any angular attitude, the clamped state of the disc 8 can be released forcibly in a steady manner. This forcible release of the clamped state provides greatly improved steadiness to unclamping operations, without failure in releasing the clamped state, regardless of angular attitudes of the disc replay apparatus 10.

Unclamping the disc can be realized independently of the self-weight of each chuck claw 36. Thus, unlike the conventional, it is unnecessary to take the gravitational center of each chuck claw 36 into account in designing the disc replay unit 10. Restrictions in designing the shapes of the chuck claws 36 are lessened greatly, thus increasing degree of freedom for design of the chuck claws.

The plurality of chuck claws 36 are configured in such a manner that the one-sided hook-shaped body 51 of each chuck claw 51 holds the disc 8 on the turntable 12, while the other-sides engaging protrusion 55 thereof is pressed by each pressing protrusion 46. Hence the support protrusion 54, functioning as a fulcrum, which opposes the engaging protrusion 55 is then forcibly rotated in the unclamping direction. Thus it is possible to obtain secure unclamping actions of the chuck claws.

Moreover, for securing the movable member 34 to the turntable 12, the plural projections 47 built on the inner surface of the cylindrical body 45 of the movable member 34 are forcibly fit into the plural recessed grooves 39 formed on the cylindrical portion 33 of the turntable 12. The movable member 34 can therefore be guided in its sliding motions in a smooth and secure manner.

Further, the turntable 12 has the tapered flange 43 therearound and the flange 43 has the lower surface descending partly in the outward direction. In contrast, the movable member 34 has the tapered flange 50 therearound in such a manner that the flange 50 has the upper surface ascending partly in the outward direction. It is therefore possible that both the operating member 18 and the operation lever 26 can be forcibly inserted between the turntable 12 and the movable member 34 in a reliable manner, with the movable member 34 slid, and then the clamped state released steadily.

The disc replay apparatus 10 equipped with the clamp mechanism 30 described above is able to release the clamped state in a stable manner. Therefore, in addition to increased degree of freedom in locating the disc 8, damages to the disc 8 and malfunctions of the mechanism, both resulted from unstable unclamping operations, can be avoided, thus reliability of the apparatus being raised markedly.

By the way, the present invention can be reduced into practice in a variety of other modifications. In the foregoing embodiment, the pressing protrusions 46 (i.e., the prohibiting device) have been formed integrally with the movable member 34 and a slide of the movable member 34 causes the pressing protrusions 46 to press the lower ends of the chuck claws 36, thus prohibiting the chuck claws 36 from rotating in the clamping direction. However, the present invention is not limited to such configuration. By way of example, the movable member 34 can be formed as a different element from the pressing protrusions 46. Alternatively, the tablesided tip end of the movable member 34 may be linked with the lower ends of the plural chuck claws 36. In such a configuration, the linking portion serves as the prohibiting device of the present invention, and sliding the movable member 34 brings about rotation of the plural chuck claws 36 until the rotation is stopped by the linking portion.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

The entire disclosure of Japanese Patent Application No. 2001-157338 filed on May 25, 2001 including the specification, claims, drawings and summary is incorporated herein by reference in its entirety.

What is claimed is:

1. A clamp mechanism comprising:
   a turntable on which a recording medium is placed, the turntable being rotated by a rotation driving device;
   a holding device for holding the recording medium on the turntable; and
   a driving device for driving the holding device in both a clamping direction determined to clamp the recording medium on the turntable and an unclamping direction determined to unclamp the recording medium from the turntable,
   wherein the driving device includes a movable member configured to be driven to slide in a perpendicular direction to the turntable, the holding device being rotated in the unclamping direction when the movable member is driven to slide in the perpendicular direction to move away from the turntable and being rotated in the clamping direction when the movable member is driven to slide in the perpendicular direction to move toward the turntable,
   the movable member having a pressing member formed integrally with the movable member, the pressing member i) pressing the holding device so as to be rotated in the unclamping direction when the movable member is driven to slide in the perpendicular direction to move away from the turntable and ii) prohibiting the holding device from moving in the clamping direction when the rotation of the holding device in the unclamping direction is completed.

2. The clamp mechanism of claim 1, wherein the holding device consists of a plurality of chuck claws each respectively disposed rotatably in a plurality of spacings formed through the turntable so that each of the chuck claws partially emerges from its respective spacing above the turntable when the holding device is driven in the clamping direction.

3. The clamp mechanism of claim 2, wherein each of the plurality of chuck claws has a body having two ends, one end being formed to hold the recording medium on the turntable and the other end being formed to be driven in the unclamping direction in response to a pressing operation performed by the pressing member.

4. The clamp mechanism of claim 3, further comprising a guide member slidably guiding the movable member in the perpendicular direction to the turntable.

5. The clamp mechanism of claim 2, further comprising a guide member slidably guiding the movable member in the perpendicular direction to the turntable.

6. The clamp mechanism of claim 2, wherein the turntable has therearound a tapered flange having a lower surface including a surface ascending outwardly in a radial direction of the flange of the turntable and the movable member has therearound a tapered flange having an upper surface including a surface descending outwardly in a radial direction of the flange of the movable member.

7. The clamp mechanism of claim 3, wherein the turntable has therearound a tapered flange having a lower surface including a surface ascending outwardly in a radial direction of the flange of the turntable and the movable member has therearound a tapered flange having an upper surface including a surface descending outwardly in a radial direction of the flange of the movable member.

8. The clamp mechanism of claim 4, wherein the turntable has therearound a tapered flange having a lower surface including a surface ascending outwardly in a radial direction of the flange of the turntable and the movable member has therearound a tapered flange having an upper surface including a surface descending outwardly in a radial direction of the flange of the movable member.

9. An information replay apparatus in which a clamp mechanism is disposed to detachably clamp a recording medium placed on a turntable rotatably driven by a rotation driving device, the clamp mechanism comprising:

a holding device for holding the recording medium on the turntable; and a driving device for driving the holding device in both a clamping direction determined to clamp the recording medium on the turntable and an unclamping direction determined to unclamp the recording medium from the turntable, wherein the driving device includes a movable member configured to be driven to slide in a perpendicular direction to the turntable, the holding device being rotated in the unclamping direction when the movable member is driven to slide in the perpendicular direction to move away from the turntable and being rotated in the clamping direction when the movable member is driven to slide in the perpendicular direction to move toward the turntable, the movable member having a pressing member formed integrally with the movable member, the pressing member i) pressing the holding device so as to be rotated in the unclamping direction when the movable member is driven to slide in the perpendicular direction to move away from the turntable and ii) prohibiting the holding device from moving in the clamping direction when the rotation of the holding device in the unclamping direction is completed.

10. The information replay apparatus of claim 9, wherein the holding device consists of a plurality of chuck claws each respectively disposed rotatably in a plurality of openings formed through the turntable so that each of the chuck claws partially emerges from its respective opening above the turntable when the holding device is driven in the clamping direction.

11. The information replay apparatus of claim 10, wherein each of the plurality of chuck claws has a body having two ends, one end being formed to hold the recording medium on the turntable and the other end being formed to be driven in the unclamping direction in response to a pressing operation performed by the pressing member.

12. The clamp mechanism of claim 1, wherein the holding device consists of a plurality of holding members each placed in a spacing formed through the turntable and each rotatable in both the clamping direction and the unclamping direction to allow the recording medium to be clamped and unclamped, each holding member having a first end to clamp the recording medium on the turntable, a second end functioning as an axis around which each holding member is rotatable, and a third end made to contact the movable member, wherein the movable member has a surface formed to push the third end of each holding member in the clamping direction when the movable member is driven in the perpendicular direction to move toward the turntable; and a protrusion formed to not only press the third end of each holding member in the unclamping direction but also prohibit the third end of each holding member from moving in the clamping direction when the movable member is driven in the perpendicular direction to move away from the turntable.

13. The clamp mechanism of claim 12, wherein the turntable has a cylindrical portion at a central position thereof and the plurality of holding members consist of three chuck claws placed at equal intervals around the cylindrical portion.

14. The clamp mechanism of claim 13, wherein each chuck claw has a bottomed recess and the turntable has a supporting protrusion from protruding into each space, wherein the supporting protrusion fit into the bottomed recess when each chuck claw is driven to rotate down to a certain height in the unclamping direction.

15. The clamp mechanism of claim 14, wherein the movable member has a cylindrical body at a central position thereof, the cylindrical body having an inner bore slidable on an outer surface of the cylindrical portion of the turntable, the turntable having a flange integrally formed with the cylindrical portion and the cylindrical portion being built perpendicularly to the flange.

16. The clamp mechanism of claim 15, wherein the cylindrical body of the movable member is guided by a groove formed on the cylindrical portion of the turntable.

17. The clamp mechanism of claim 16, wherein a spring is placed to continuously force the movable member toward the turntable.

18. The clamp mechanism of claim 1, wherein the movable member has a cylindrical body portion having both ends along an axial direction thereof and a protrusion protruded from one end in a lateral direction perpendicular to the axial direction, the movable member being disposed in the clamp mechanism to allow the protrusion to function as the pressing member.

* * * * *